United States Patent
James et al.

(10) Patent No.: US 7,967,967 B2
(45) Date of Patent: Jun. 28, 2011

(54) APPARATUS AND METHOD FOR ELECTROCHEMICAL MODIFICATION OF LIQUID STREAMS

(75) Inventors: Patrick Ismail James, Boulder, CO (US); George Stejic, Arlington, VA (US)

(73) Assignee: Tesla Laboratories, LLC

( * ) Notice: Subject to any disclaimer, the term of this patent is extended or adjusted under 35 U.S.C. 154(b) by 1194 days.

(21) Appl. No.: 11/623,658

(22) Filed: Jan. 16, 2007

(65) Prior Publication Data

US 2008/0169196 A1    Jul. 17, 2008

(51) Int. Cl.
*C25B 9/00*    (2006.01)
*C25C 7/00*    (2006.01)
(52) U.S. Cl. ...... 204/554; 204/222; 204/242; 204/275.1
(58) Field of Classification Search .................. 204/554, 204/222, 275.1, 242
See application file for complete search history.

(56) References Cited

U.S. PATENT DOCUMENTS

| | | | |
|---|---|---|---|
| 3,459,515 A * | 8/1969 | Bergmann | 75/238 |
| 4,272,333 A * | 6/1981 | Scott et al. | 205/144 |
| 5,565,107 A | 10/1996 | Campen et al. | |
| 5,635,051 A | 6/1997 | Salas-Morales et al. | |
| 5,958,210 A | 9/1999 | Siu et al. | |
| 6,298,996 B1 | 10/2001 | Spiegel et al. | |
| 6,432,292 B1 * | 8/2002 | Pinto et al. | 205/145 |

* cited by examiner

*Primary Examiner* — Harry D Wilkins, III
*Assistant Examiner* — Zulmariam Mendez
(74) *Attorney, Agent, or Firm* — Miodrag Cekic (57) ABSTRACT

An apparatus and a method for electrochemical modification of liquid streams employing an electrolytic cell which utilizes an oxidation site defined by an anode, an anode compartment comprising liquid electrolyte anolyte where oxidation is effected, a cathode compartment comprising liquid electrolyte catholyte where reduction is effected, a cathode comprising conducting cathode particulates forming a cathode particulates bed and a current feeder device in at least intermittent contact with said cathode particulates where the cathode particulates are in motion and the particulates motion is substantially independent of bulk electrolyte flow, a separator which confines the cathode particulates to the cathode compartment, constrains electrolyte flow through the cathode particulates bed and permits ionic conduction of current between the anode and cathode, a cathode particulates conveyance system that manipulates cathode particulates motion. A separate system circulates the liquid undergoing modification through the electrolytic cell. An unidirectional current driving system drives unidirectional electric current supported by the liquid streams from the anode through the anolyte and the separator and into the catholyte and to the cathode particulates and to the current feeder device during the contact between the cathode particulates and the current feeder device.

22 Claims, 10 Drawing Sheets

Side View

Top View

APPARATUS AND METHOD FOR ELECTROCHEMICAL MODIFICATION OF LIQUID STREAMS

STATEMENT REGARDING FEDERALLY SPONSORED RESEARCH AND DEVELOPMENT

This invention was made and reduced to practice using US government funding under National Institutes of Health (NIH) Small Business Innovation Research (SBIR) grant 1 R43 ES013622-01A1. The US government has certain rights in this invention.

FIELD OF THE INVENTION

The invention relates to an apparatus and a method for modification of liquid streams which contain organic and/or inorganic impurities. More precisely, the invention is concerned with an electrolytic cell technology with potentials to achieve reduction of contaminants commonly found in liquid waste streams and economically feasible extraction of selected dissolved contaminants for commercial applications.

BACKGROUND OF THE INVENTION

Contamination of liquid streams with various organic and inorganic pollutants is a serious environmental problem affecting quality of global environment and represents significant threat to human health and safety. Substantial heavy metal contamination of aquatic environments arises from commercial mining and metal extraction processes, surfaces modification and protection processes, or communal and industrial waste sites resulting from a variety of active or defunct industrial fabrication and manufacturing activities. Similarly, significant organic water pollutants, like aliphatic, aromatic, or halogenated hydrocarbons and phenols, are frequently associated with oil exploration, extraction and refining, chemical industry, or large-scale farming and food processing.

In addition to potential for significant environmental damage, polluted liquid streams represent sources of desirable raw materials like heavy metals and metal oxides. For example, the Berkeley Mine Pit in Butte, Mont. alone represents an estimated 30 billion gallons of acid mine drainage which contains ~180 ppm of copper along with other metals and thus could yield up to 22,000 tons of pure copper by use of a small treatment facility.

The prevailing method of removal of heavy metal ions from liquid solutions is chemical precipitation. This process is burdened by complexity, high cost, clear preference for extremely large facilities and high-volume operations, and efficiency decrease with decrease in concentration of pollutants. One fundamental disadvantage is the resulting byproduct of heavy sludge which is much more toxic than the source material. The sludge mandates further processing and costly long term disposal as a highly toxic waste. Many similar disadvantages burden alternative heavy ion removal methods that may incorporate: filtration, ion exchange, foam generation and separation, reverse osmosis, or combinations of listed processes.

Modification of polluted liquid streams can be accomplished efficiently using electrochemical processes. Electrochemical methods of reduction of metal ions or oxidation of organic pollutants do not suffer from described disadvantages of complexity, strong preference for large scale operations, or toxic byproducts. Advanced electrochemical methods like Spouted Bed Electrode (SBE) electrolytic technology is relatively efficient even in the cases of comparatively low contaminant concentrations of about 1000 ppm.

Liquid stream modification using moving bed electrodes is well-known to prior art. U.S. Pat. No. 4,272,333 to Scot et al. discloses a method of moving bed electrolysis where motion of particulates bed electrode, imposed by the circulation of electrolyte, prevents electrode particulates aggregation and maintains at least intermittent contacts between the moving particulates bed electrode and current feeder. Scot et al. report copper, zinc, cobalt, and manganese ions reduction from electrolytes with varying pH values.

U.S. Pat. No. 5,565,107 to Campen et al. discloses a process of electrochemical purification of "streams which contain organic and/or inorganic impurities". The disclosed process utilizes a reactor with "a water-containing reaction zone which comprises providing a packed bed of activated carbon, applying an electrochemical potential across said packed bed and simultaneously feeding a reactant selected from the group consisting of ozone and hydrogen to said packed bed."

Efficient electrowinning of zinc in an electrowinning cell using "moving" or "moving packed bed" electrode is disclosed in the U.S. Pat. No. 5,635,051 to Salas-Morales et al. from predominantly acidic electrolytes. Related U.S. Pat. No. 5,958,210 to Siu et al. discloses electrowinning of zinc in an electrowinning cell from alkaline electrolytes. Both patents also disclose an industrial scale eight-draft-tubes parallel electrowinning cell structure shown in side elevation in corresponding FIG. 2.

Spiegel et al. in the U.S. Pat. No. 6,298,996 report purification of metal and toxic organic compounds from polluted aqueous waste streams using "an advanced electrolytic cell technology employing a dynamic spouted electrode". Spiegel et al. also disclose a four-independent-cells device in which electrolyte is pumped in a parallel manner into the cells and returned to the reservoir.

Figure 1:
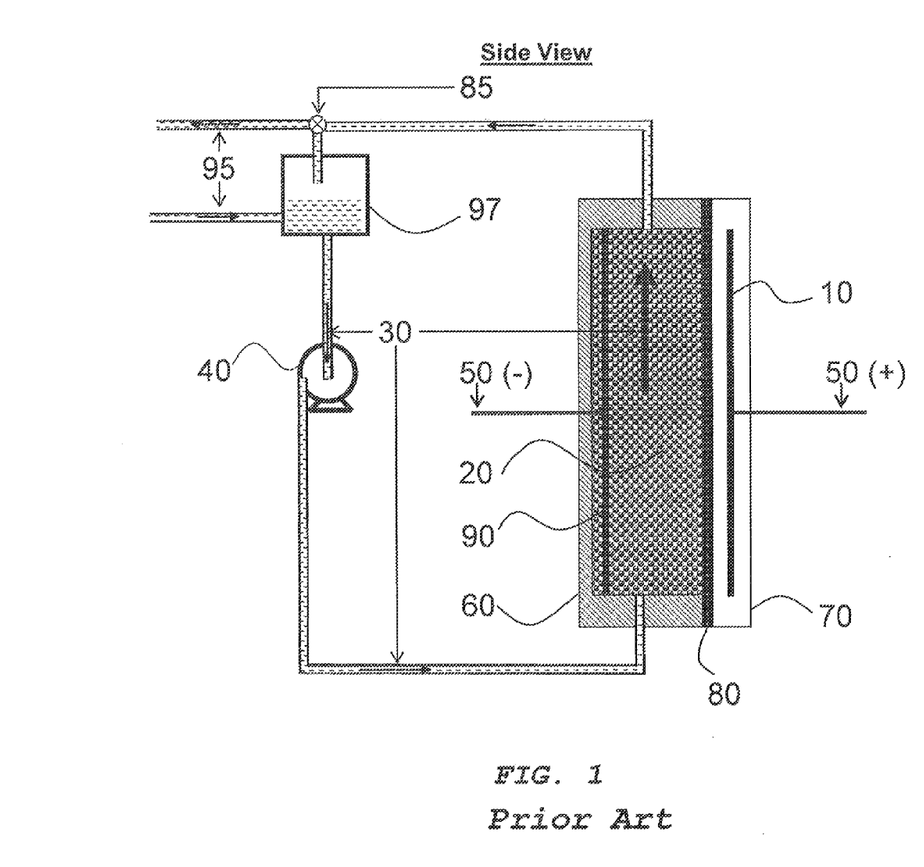
FIG. 1. is a schematic cross-sectional side view of a spouted bed electrolytic cell in accordance with prior art.

A simplified schematic side view cross-section of a SEB cell of prior art is given in FIG. 1. A typical SEB cell consists of one or more anodes 10 coupled to one or more high surface area cathodes 20 in the form of spouted particulates bed, separated by a distance. Catholyte flow 30, driven by an external catholyte pumping station 40, is directed through the high surface cathode 20 to achieve vigorous particulates bed convection needed for high degree of electrode utilization. Unidirectional current is fed into the cell via anode current feed 50 (+) and out via cathode current feeder device 90 and cathode current feed 50 (−). The cell illustrated in the FIG. 1. is a simple planar configuration comprising cathode cell chamber 60 and anode cell chamber 70 separated by a separator (porous membrane) 80 which directs bulk electrolyte flow 30 while maintaining intimate electrochemical contact between the separated cathode 20 and anode 10. Depending upon the state of control valve system 85 the cell can operate in a batch mode processing the fluid contained in the reservoir 97, or in a flow-through mode modifying liquid streams delivered by external pipelines 95. A mode of operation created by any combination of the flow-trough and batch modes can be achieved if desired in accordance with application specific requirements and circumstances.

An important common feature of the prior art SBE devices and processes is the fact that actuation of the electrode bed is achieved by vigorous circulation of electrolytes generally achieved by strong pumping action of various external pumping systems. This feature, clearly motivated by simplicity of the mechanical design, is inherently suboptimal because the achievement of optimal liquid stream flow rate is sacrificed to the requirement for vigorous spouted bed mixing and circulation. The systems of the prior art frequently comprise relatively powerful pumping stations, like one denoted by the reference numeral 10 (corresponding reference numeral 31 in the U.S. Pat. Nos. 5,635,051 and 5,958,210).

In addition to higher capital cost and higher energy consumption, pumping stations scaled up to sufficiently mix and circulate particulates beds in SPE cells additionally burden the overall efficiency of the liquid stream modification processes by limiting the reactor residence time of treated liquid stream volumes. The devices and methods in accordance with the present invention are designed to essentially decouple the fluid flow and motions of the SBE. This novel characteristic of the devices designed in accordance with the present invention allows for independent optimization of the SBE motions necessary for improved overall efficiency of the liquid stream modification processes and efficient electrolysis, prevention of particulates aggregation, and dendrite formation, and treated fluid circulation optimized for sufficient reactor resident time necessary for efficient liquid stream treatment even in cases of streams comprising sub 100 ppm concentrations of treatment target materials.

SUMMARY OF THE INVENTION

The present invention considers an apparatus and a method for electrochemical modification of liquid streams employing an electrolytic cell which comprises a cathode comprising conducting cathode particulates forming a cathode particulates bed, and a current feeder device in at least intermittent contact with the cathode particulates. The cathode particulates are in motion and the particulates motion is substantially independent of bulk electrolyte flow. A separator confines the cathode particulates to the cathode compartment, constrains electrolyte flow through the particulate cathode bed and permits ionic conduction of current between the anode and cathode. A separate cathode particulates conveyance system drives and manipulates cathode particulates motion.

The method of present invention comprises: circulating liquid stream undergoing modification through said electrolytic cell, activating cathode particulates conveyance system to form the moving cathode particulates bed immersed in the catholyte and transporting the cathode particles bed substantially independently from catholyte circulation, bringing cathode particulates bed in at least intermittent contact with the current feeder device, energizing the system for conducting unidirectional electric current to drive current supported by the liquid streams from the anode through the anolyte and the separator and into the catholyte and to the cathode particulates and to the current feeder device during the contact between the cathode particulates and the current feeder device and sustaining the achieved current conduction long enough to electrochemically react at least detectable quantities of targeted constituents of liquid streams undergoing modifications.

BRIEF DESCRIPTION OF THE DRAWINGS

Like reference numerals identify like parts throughout the drawings.

DETAILED DESCRIPTION OF THE INVENTION

Figure 2:
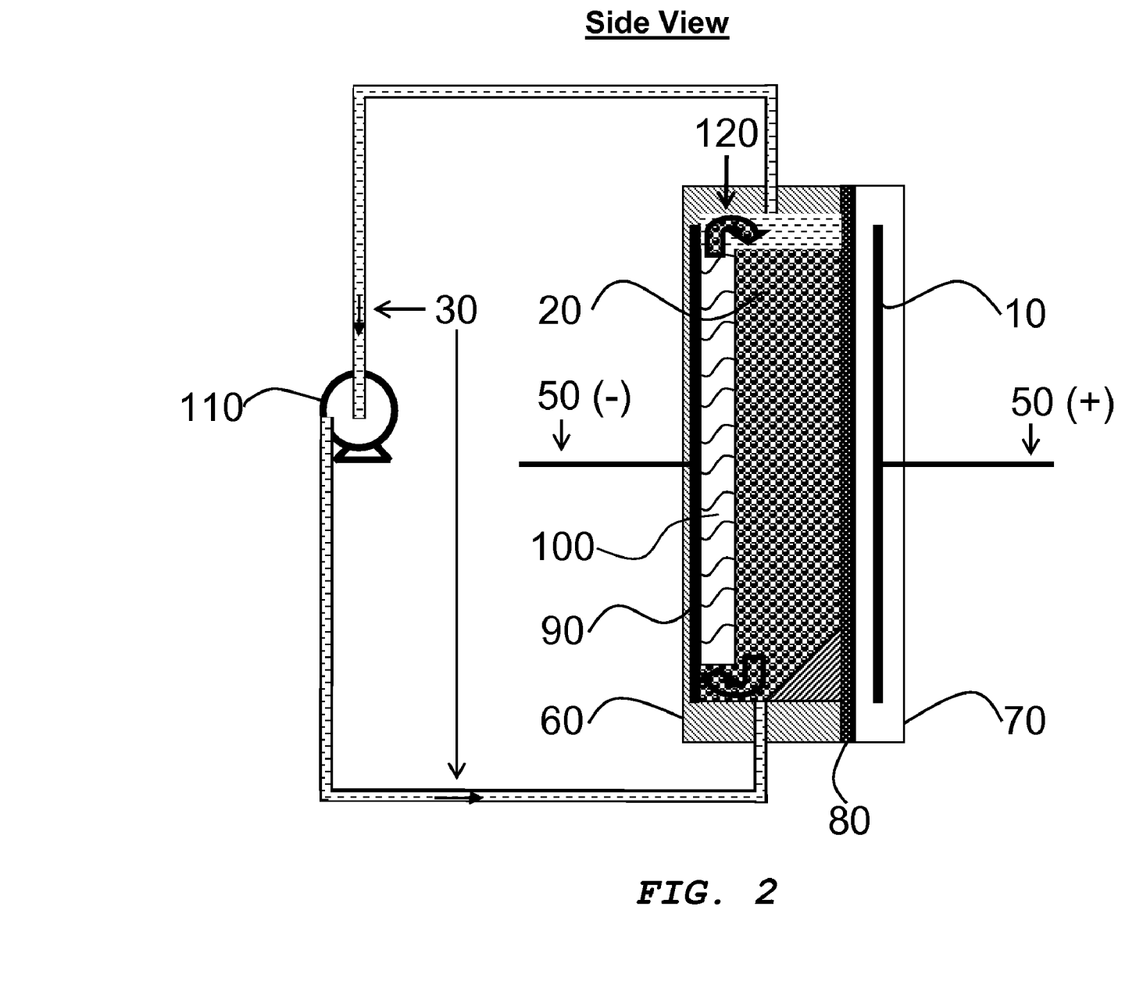
FIG. 2. is a schematic cross-sectional side view of a spouted bed electrolytic cell in accordance with the present invention.

A simplified schematic side view cross-section of the electrolytic cell of in accordance with current invention is given in FIG. 2. The principle difference of the cell depicted in FIG. 2 is the addition of a separate cathode particulates conveyance system 100 that manipulates cathode particulates motion substantially independently from the catholyte flow 30. In contrast with the prior art pumping systems similar to one depicted in FIG. 1, the external catholyte pumping station 110 of current invention in FIG. 2 needs only provide relatively slow catholyte flow 30 and can be readily adjusted and directed throughout the cathode particles bed for easy process optimization without significantly altering the particles bed motion. The pumping station 110 of current invention requires relatively lower pumping capacity resulting in smaller size, lower cost, and, most importantly, lower electric energy consumption and the ability to readily manipulate and control the catholyte flow rate and pattern with the moving cathode particles bed.

Figure 3A:
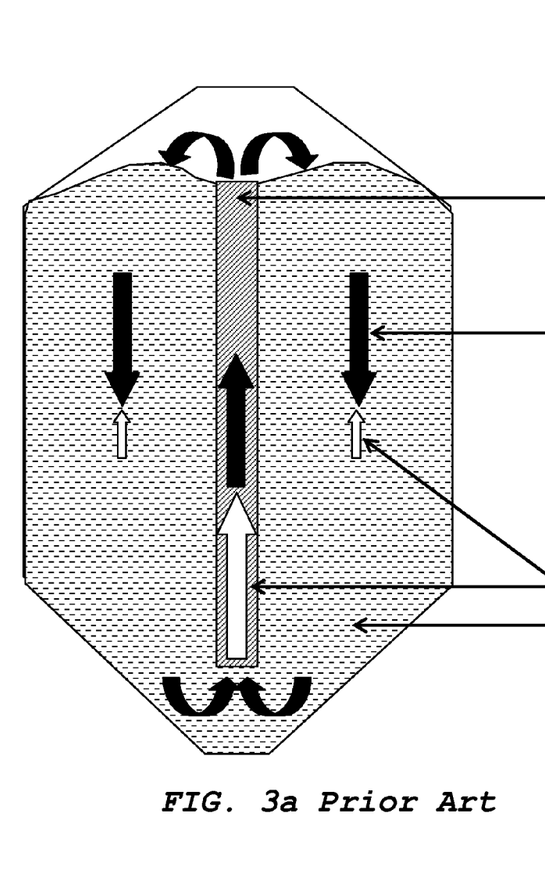
FIG. 3. is a schematic cross-sectional front view comparing the electrolyte flow and cathode particulates convection of an electrolytic cell in accordance with prior art and an electrolytic cell in accordance with the present invention.
Figure 3B:
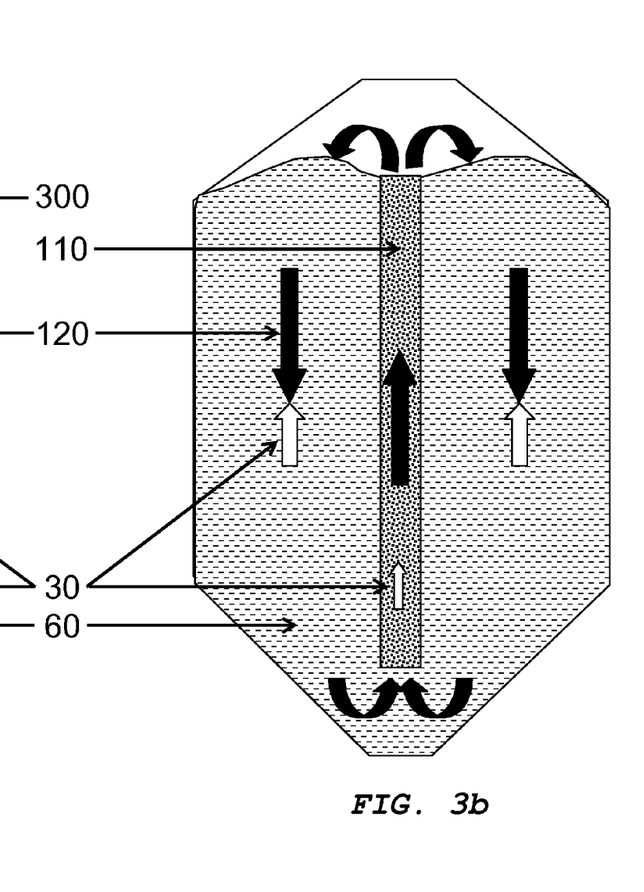

The principle difference in the catholyte flow 30 and cathode particulates convection 120 between the prior art cells with spouting tubes 300 ("draft tube 16" in U.S. Pat. Nos. 5,635,051 and 5,958,210) and the electrolytic cell with a separate cathode particulates conveyance system 100 of current invention is given schematically in FIG. 3a and FIG. 3b. While the spouting tube 300 of a prior art cell induces vigorous catholyte flow 30, causing circulation of excessive volumes of catholyte in order to indirectly produce sufficient cathode particulates convection 120, the particulates conveyance system transfer momentum predominantly directly to the cathode particulates, contributing only marginally to the catholyte flow 30. The opportunity for independent optimization of the catholyte flow 30 and catholyte ions resident time leads to the extension of the parameter space of efficient and economically feasible operations of cells in accordance with the present invention to the concentration ranges well below 100 ppm of target ion concentrations.

A variety of electroactive solutions comprising solvent, electrolyte, and possibly supporting electrolytes meeting chemical and electrochemical potential window stability criteria will work with the present technology. The anolyte and catholyte can be the same or different depending on the targeted application. Specifically, initial demonstrative work for reducing the technology to practice employed a single shared electrolyte for anolyte and catholyte. A synthetic acid mine drainage solution was prepared using water as the solvent as this represents the most common solvent.

The ionically conducting species of the electrolyte were provided by added ionizing compounds which dissolved in the solvent. While a plethora of suitably soluble, conductive, and electrochemically stable compounds exist, initial work utilized copper sulfate pentahydrate. Here the sulfate anion was stable in the electrochemical potential window of interest and the cupric ion provided the target species for electrochemical reduction at the cathode. Water oxidation to generate oxygen was targeted at the anode as the complimentary oxidation reaction to the targeted reduction process.

Several supporting electrolytes were also added to better mimic the composition of acid mine drainage. Sulfuric acid was added to lower the solution pH while sodium sulfate was added to increase the sulfate concentration to levels typical of actual acid mine drainage. As the sulfate and sodium are inactive in the potential window of interest, they act simply as supporting electrolytes. Similarly, while protons can be reduced to hydrogen at the cathode, except under mass transfer limitations, cupric ion reduction will dominate and the dissolved protons will effectively serve as supporting electrolyte ions.

Figure 4A:
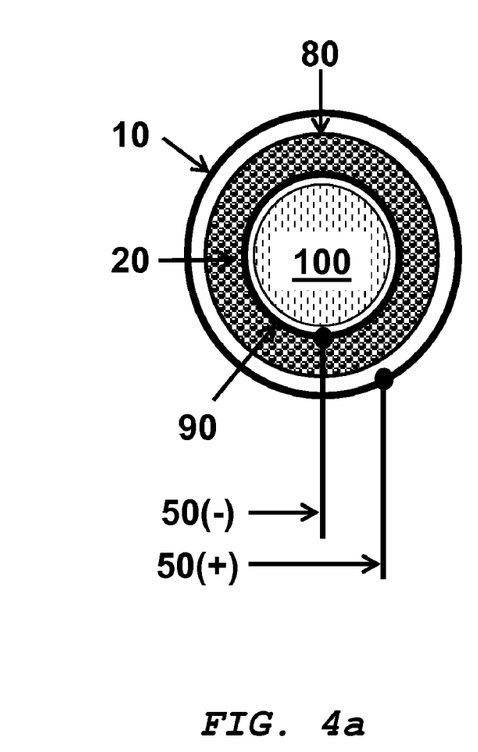
FIG. 4. is a schematic cross-sectional top view of a cylindrical electrolytic cell in accordance with an embodiment of the present invention.

An embodiment of electrolytic cells in accordance with the present invention possessing cylindrical symmetry is shown in FIG. 4. The cells in FIG. 4 comprise anode 10 and cathode 20 in the form of coaxial cylinders. In FIG. 4a cylindrical spouted bed cathode 20 encompasses the cathode particulates conveyance system 100, while both are encompassed by the separator 80 and cylindrical anode 10. In the highest cylindrical symmetry configuration, the cathode particulates conveyance system 100, the cathode current feeder device 90, the spouted bed cathode 20, the separator 90, and the anode 10 comprise a system of cylindrical tubes filled by the electrolyte.

Figure 4B:
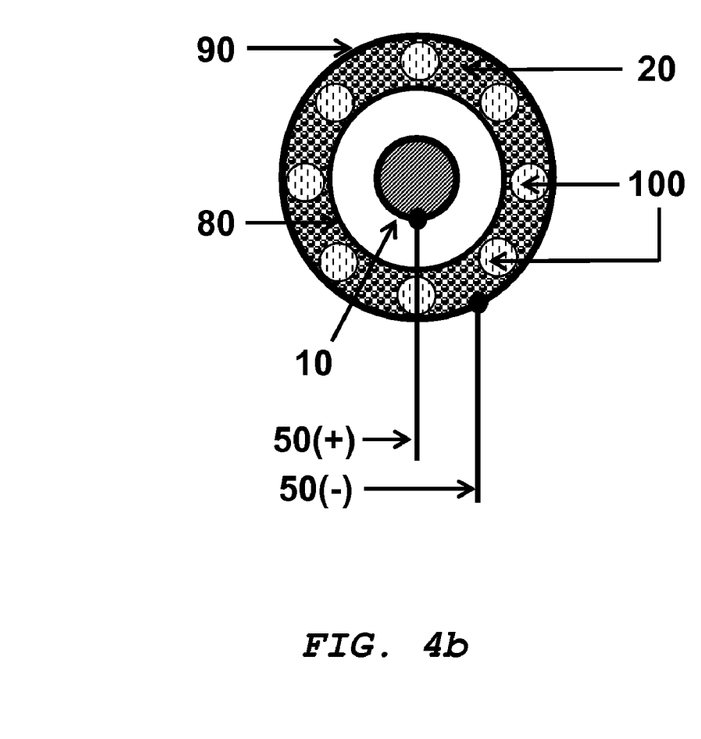

In FIG. 4b the cylindrical anode 10 in the form of conductive rod is encompassed by the separator 80 and spouted bed cathode 20 sharing a common vertical axis of cylindrical symmetry. The cathode particulates conveyance system 100 is distributed throughout the cathode particles bed in order to provide substantially uniform actuation of the cathode bed particulates. It is obvious to the practitioners of the art of electrochemistry that systems with somewhat different geometries that preserve similar topology as the cells given schematically in FIG. 2 and FIG. 4 represent an apparatus in accordance with the present invention and will function in the manner in accordance with the claims of the present application.

It is frequently desirable, for an efficient and consistent function of an electrolytic cell, that anode 10 does not lose electrode material to the oxidation reaction on anode surfaces inseparable from the proper function of any electrolytic cell. Anodes which substantially preserve their original shape and relationship with the other components of electrolytic cells are known in the art to be geometrically stable.

Many geometrically stable anodes comprising platinized titanium, niobium coated copper, and oxide coated conductive substrate or combination of this and other refractory materials are known to the practitioners. The anodes can incorporate relatively smooth active surfaces, or porous surfaces that benefit from the additional surface area introduced by the added pores.

In addition, the anode materials comprising lead and lead alloys can be consider geometrically stabile over the electrochemical-process-relevant periods of time in spite the fact that the anode surfaces exhibit very gradual corrosion. The corrosion process of the lead comprising anode surfaces is especially slow in processes related to electrochemical modifications of liquid streams containing diluted target materials. For the purpose of the present invention the anodes comprising lead and lead alloys are included in the set of geometrically stabile anodes.

Commercially available anodes like the Eltech Systems Corporation EC-600 dimensionally stable anode (DSA) comprised of tantalum doped iridium oxide coatings on titanium substrates and optimized for oxygen generation were successfully tested during the development of methods and apparatus of the present invention.

Separators 80 perform confinement of the cathode particulates to the cathode compartment and constrain of electrolyte flow through the cathode particulates bed. The separator 80 is in form of membrane, diaphragm, or other permeable mechanical barrier material that permits ionic conduction of current between the anode and the cathode. The preferred separator materials do not participate in electrochemical reactions of the cell, but the listed separator functions can be in principle performed by separators constructed from materials that support the ionic current conduction by ion-exchange reactions on the separator surfaces. The cells with particulates motion substantially independent of bulk electrolyte flow, utilizing ion-exchange separator membranes are recognized as specific embodiments of the current invention.

Separators 80 with surfaces that define planes are depicted in FIG. 2, while separators 80 with cylindrically-symmetric surfaces that define tubs are depicted in FIG. 4. Because of the influence of gravity on the cathode particulates convection, the preferred orientation of separator surfaces that define the plane is with the plane parallel to the vertical axis, while the preferred orientation of the cylindrically-symmetric separator surfaces is with the cylindrical axis parallel to the vertical axis. It is recognized that any non-horizontal orientation, with the separator surfaces planes and/or cylindrical axis form non-zero angles with horizontal planes, will function in accordance with the present invention.

Figure 5:
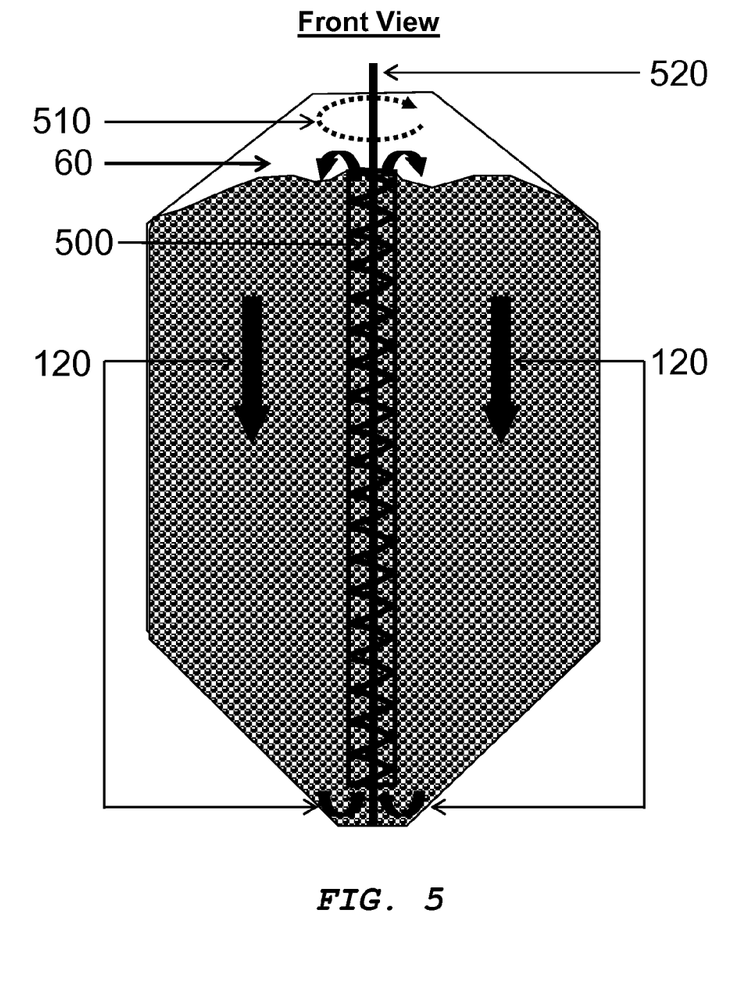
FIG. 5. is a schematic cross-sectional side view of an electrolytic cell with a mechanical cathode particulates conveyance system comprising a screw type conveyor in accordance with the preferred embodiment of the present invention.

The preferred cathode particulates conveyance system 100 that manipulates cathode particulates motion is a mechanical system in the general form of a screw type conveyor 500 ("Archimedes screw") shown schematically in FIG. 5. The cathode particulates convection is achieved by a direct action on the cathode particulates by a helicoidal surface that rotates in preferred sense 510 around the axis 520 powered by an external driver. The diameter of the system, rotational velocity, and the driving power should be designed for an operation optimal for the particular application. The preferred speed of rotation for the test device used for the development of this invention is in the range from 10 RPM to 500 RPM.

Figure 6:
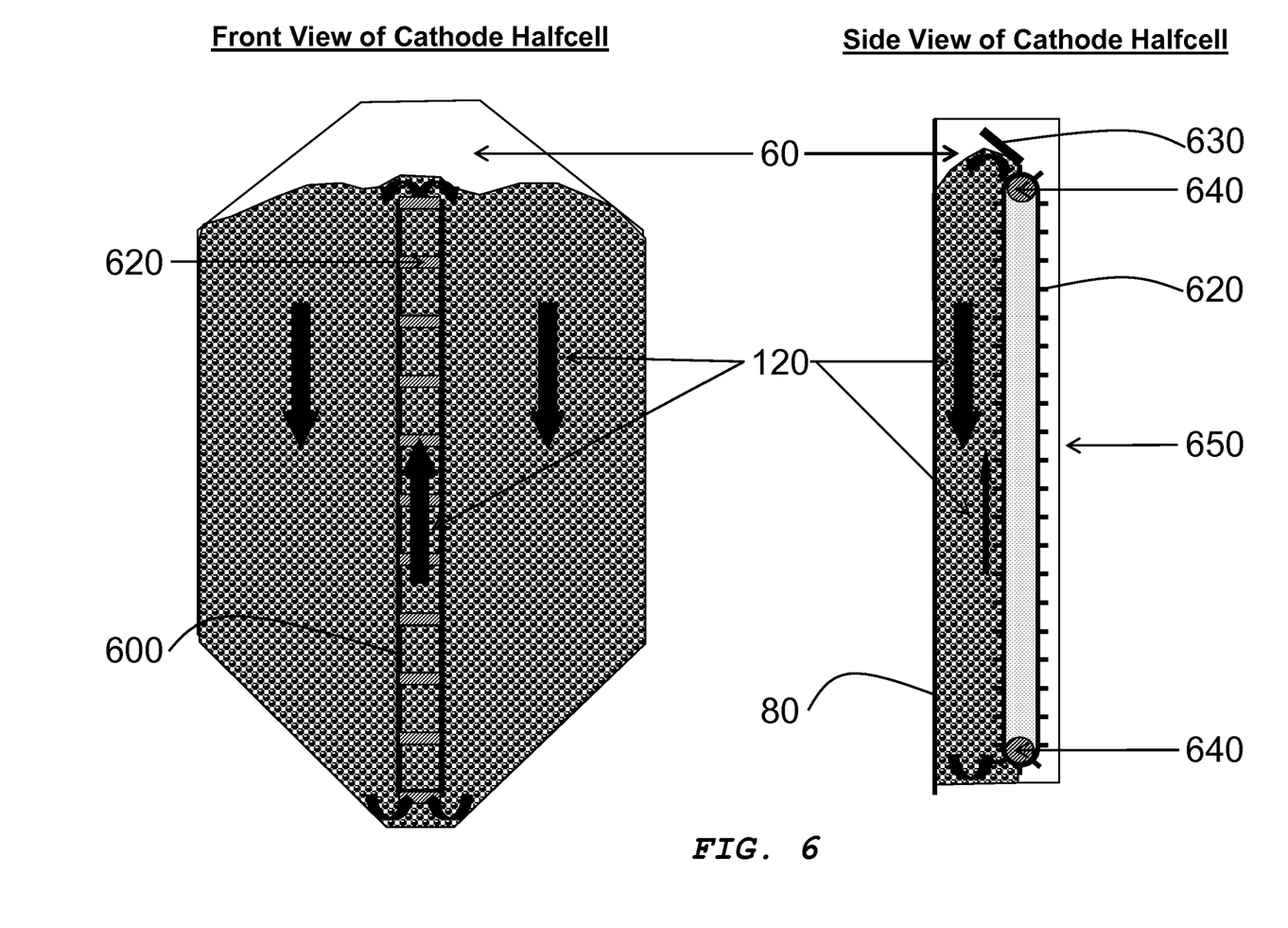
FIG. 6. is a schematic cross-sectional side view of an electrolytic cell with a mechanical cathode particulates conveyance system in accordance with a different embodiment of the present invention.

A different embodiment of the cathode particulates conveyance system 100 is shown in cross-sections in FIG. 6. where the mechanical cathode particulates conveyance system comprises a moving bucket 620 type conveyor 600. The moving bucket 620 type conveyor 600 comprises a belt 650 guided and actuated to circulate by the actuators 640. The belt carries buckets 620 positioned periodically along the belt. The circulation of the belt and the direct action of the buckets upon the cathode particulates causes desired cathode particulates convection 120. Positioning of the particulates guide 630 in the proximity of the locus of separation of cathode particulates from the conveyer 600 facilitates the efficiency of the cathode particle convection.

A different variation on the moving bucket type mechanical conveyer 600 is a moving belt 650 type conveyer where bucket 620 are omitted and the momentum is predominantly transferred to the cathode particulates by frictional forces between the belt 650 and the particulates.

In the embodiment when at least a fraction of the cathode particulates comprise at least a portion of their mass in the form of ferromagnetic material, significant interaction between the cathode particulates and the cathode particulates conveyance system 100 can be achieved when at least one permanent magnet is attached to the conveyer belt 650 in such manner that significant portion of the magnetic field penetrates the cathode chamber 60. In this embodiment, the particles guide 630 needs to be positioned in the proximity of the conveyer at a preferable clearance smaller than the particulates' diameter in order to achieve efficient separation of magnetized particulates from the proximal permanent magnet.

A variation of this embodiment where the conveyer belt material comprises permanently magnetized portions to produce the cathode chamber penetrating magnetic field is recognized to be in the scope of the present invention. It is also recognized that many mechanical and magnetic cathode particulates conveyance systems can operate with synergy. Combinations of mechanical cathode particulates conveyance subsystems and magnetic cathode particulates conveyance systems can be desirable to drive sufficient cathode particulates conveyance either in modular liquid streams modification operations or as parts and subsystems of integrated electrolytic cells.

A different embodiment utilizing magnetic interaction between the cathode particulates and the cathode particulates conveyance system uses traveling magnetic fields. Sources magnetic fields comprise coils with loops of electric conductors each arranged to generate magnetic fields symmetric with respect to prospective horizontal planes of symmetry when loops of electrical conductors are energized by at least one external source of electric current. This external source of electric current flowing through electromagnets' loops of electric conductors is generally independent and separate from the system for conducting unidirectional electric current supported by the liquid streams from the anode through the anolyte and the separator and into the catholyte and to the cathode particulates and to the current feeder device during the contact between the cathode particulates and the current feeder device.

Figure 7:
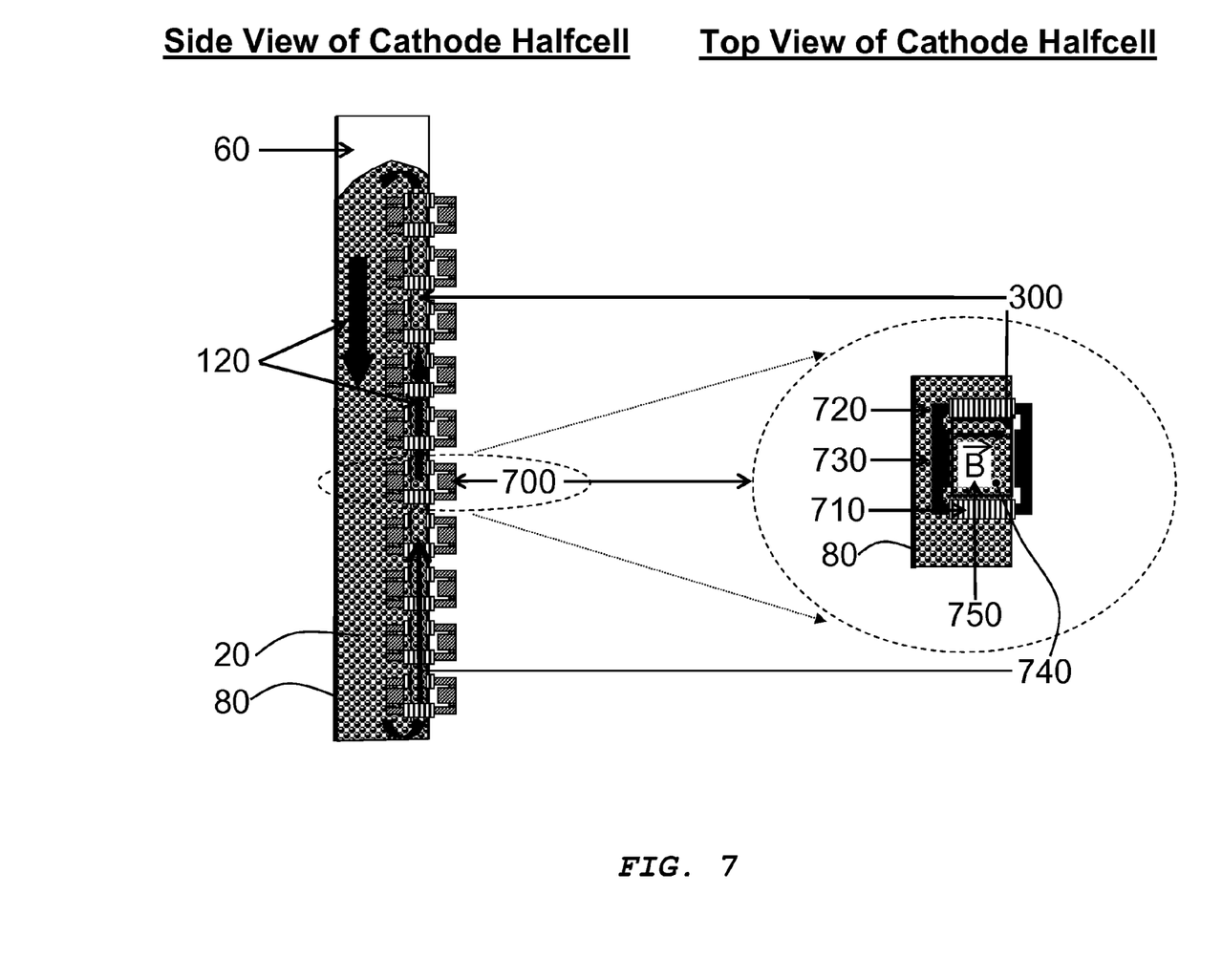
FIG. 7. is a schematic cross-sectional side and top views of an cathode halfcell with a magnetic cathode particulates conveyance system in accordance with an additional embodiment of the present invention.

A schematic rendering of the embodiment shown in FIG. 7 utilizes spouting tube 300 and a set of electromagnets 700 with coils 710, ferromagnetic core 720, and ferromagnetic pole pieces 730. When energized by the external source of electric current modulated in time to create magnetic pulses traveling with a velocity 740 with non-zero vertical component. The magnetic pulse is formed by combined time-variable magnetic fields produced by the coils. The fields are characterized by a volume of high magnetic induction $\vec{B}$ 750 that continuously transfers toward the upper end of the cathode compartment 60 for the duration of the magnetic pulse.

The cathode particulates are chosen to have at least partially conductive surfaces necessary to achieve at least intermittent contact between particulates and the current feeder device. When the traveling magnetic inductance 750 intersects the surfaces of the proximal cathode particulates it induces eddy currents in the particulates that interacts repulsively with the magnetic inductance 750. Consequently, an upward traveling pulse of the magnetic inductance 750 acts as a piston transferring generally upward momentum to the cathode particulates.

The cathode particulates support unidirectional electric current flowing through the electrolytic cell. Consequently, the cathode particulates must comprise electrically conductive or semiconductive materials consisting elements, metals, alloys, compounds, ceramics, organic polymers, and inorganic polymers. The electrolytic cell in accordance with the present invention utilizes plurality of particulates interacting with exposed surfaces of the current feeder device 90. This allows for broad ranges of particulate sizes ranging generally from 0.1 mm to 10 mm of length in the characteristic dimension (possible characteristic dimensions include but are not limited to radius, diameter, ellipsoid axis, cylindrical radius and axis).

The resistivity of the current carrying component of particulates suitable for practical utility can range from about 1 nano ohm centimeters to about 20,000 nano ohm centimeters. The cathode particulates can comprise common metals such as copper, aluminum, lead, nickel, iron, mild steel, stainless steel, zinc, titanium, silver, gold, platinum, palladium, tin, tungsten, carbon, and it's mixtures and combinations. Less common materials for the cathode particles such as conducting polymers, ceramics, semiconductors, and combinations of suitable substrate materials exhibiting appropriate conductivity would also work with the present invention.

Products of electrochemical reactions associated with the proper function of an electrolytic cell may accumulate in the cell and interfere with long term cell functionality. Also, products of electrochemical reactions may be of commercial interest as produced or represent raw materials for further processing. The controlled accumulation of products of electrochemical reactions can occur as an attachment and deposition on the cathode particulates, a sedimented material concentrated at lower parts of the cell chambers, or as incremental rise of concentration of materials dissolved in the electrolyte or the presence of suspended product particulates.

Figure 8:
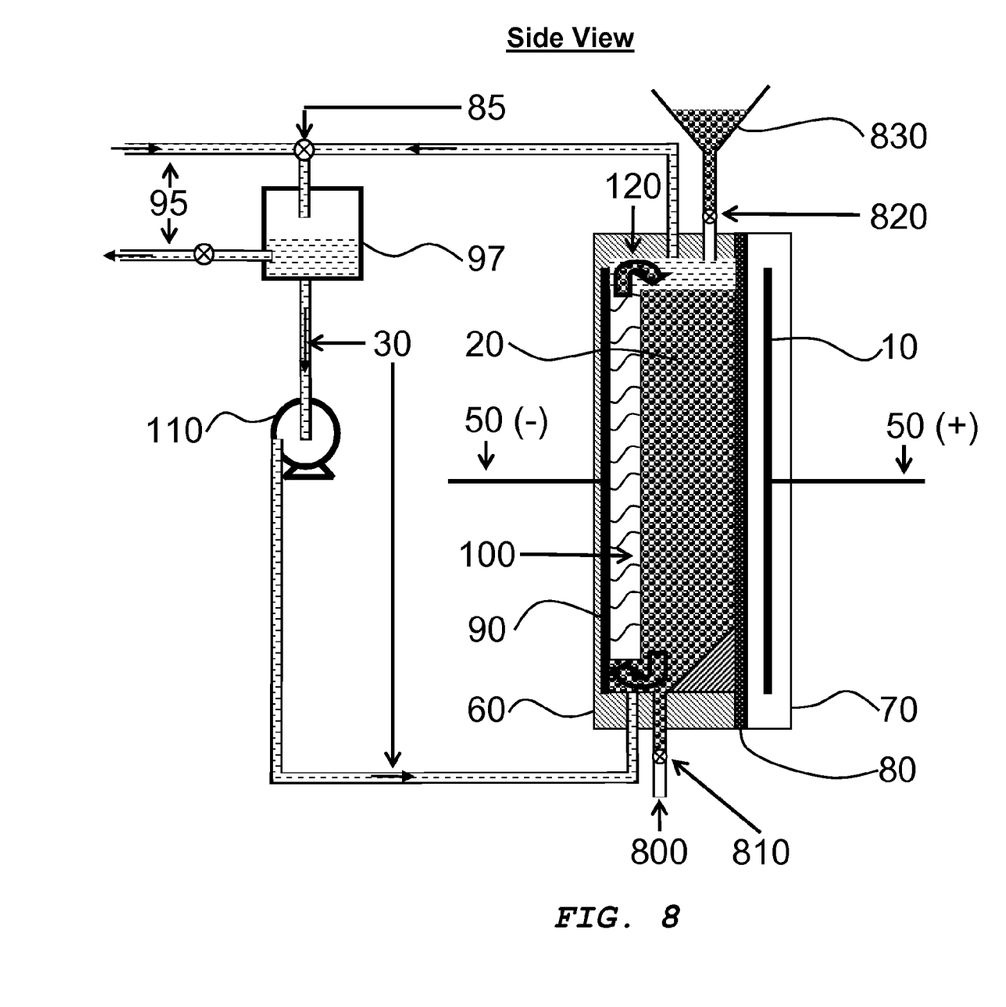
FIG. 8. is a schematic cross-sectional side view of an electrolytic cell with systems for removal of products of electrochemical reactions in accordance with the present invention.

FIG. 8 depicts several devices for controlled removal of products of electrochemical reactions from the cell. Products of electrochemical reactions associated to the cathode particulates can be separated by extracting at least a portion of cathode particulates using separating pipeline 800 controlled by removal valve system 810. The replacement of the cathode particulates is achieved via replacement valve system 820 from the reservoir of fresh cathode particulates 830.

The separating pipeline 800 can be used to extract and separate sedimented products from the electrolyte and cathode particulates. The products of electrochemical reactions dissolved in the electrolyte can be removed using external pipeline 95 from the reservoir 97.

Processes of controlled removal of products of electrochemical reactions can be performed continuously during the operation of the electrolytic cell as customary in the art of electrochemical disinfection or pollution removal, or using batch process as customary in art of electrowinning of metals. Both modes of operation are in accordance with the present invention.

Figure 9:
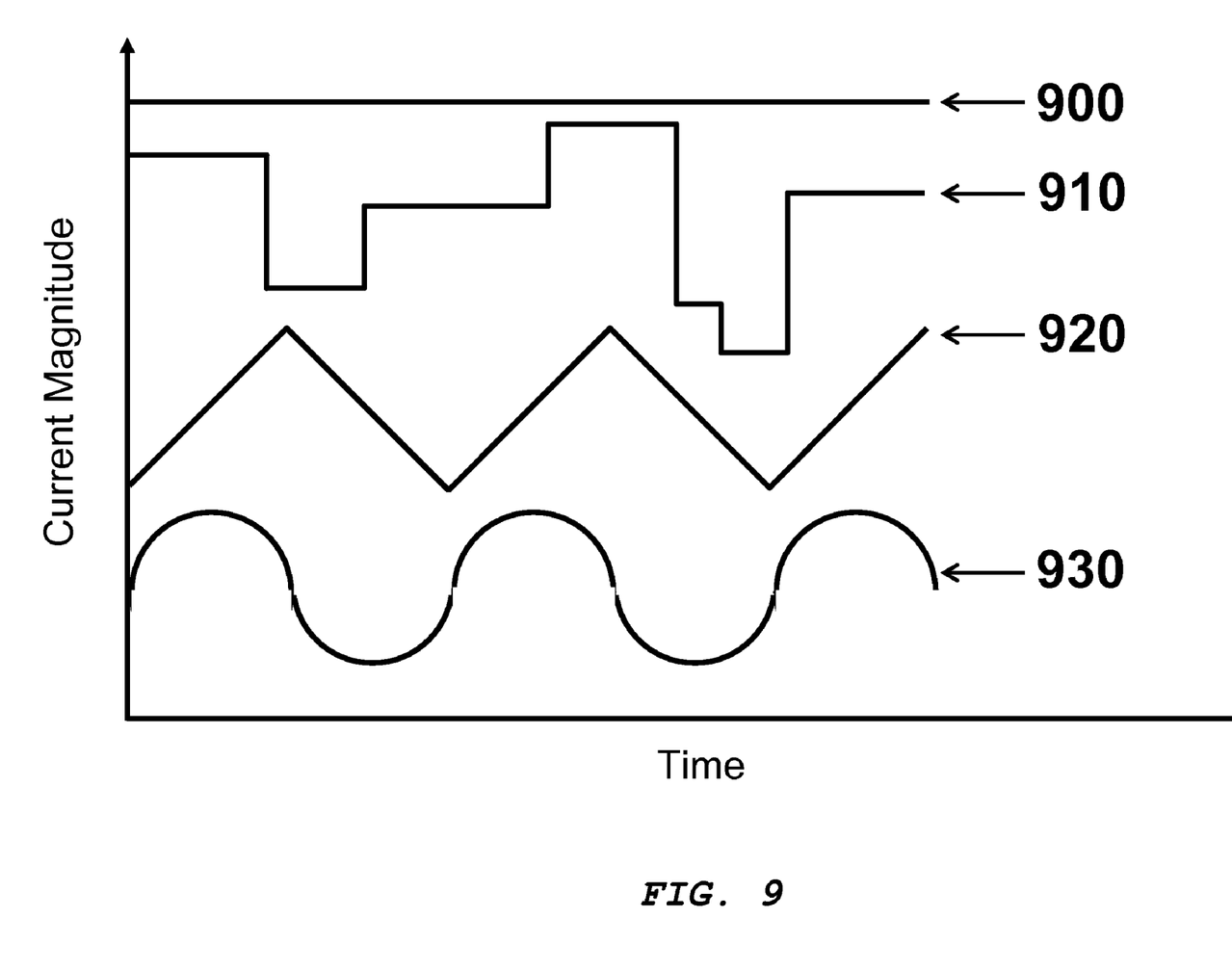
FIG. 9. is a graphic representation of unidirectional current profiles schematic in accordance with the present invention.

The direct current of constant intensity during the conduction like the current profile 900 graphed in FIG. 9 is frequently the preferred choice of current profile because of stability and simplicity of operation and associated equipment. Other unidirectional current sources producing periodic current profiles like profiles 920 and 930 also can be used in a device in accordance with this invention. The current profiles with time dependences like 920 and 930 may provide advantages for specific targeted applications such as selective product or product morphology control. Aperiodic unidirectional currents like profile 910 in FIG. 9 are frequently associated with programmable current sources operating under control of digital controllers.

DESCRIPTION OF PREFERRED EMBODIMENT

A brief overview of the proffered embodiment of the technology is included here. Over the course of relevant research a number of additional embodiments were conceived and explored. It is noted that this represents demonstration of technology function in the particular application and consequently is not optimal for many possible applications of the present invention.

A bench-scale version of the electrochemical apparatus was constructed and demonstrated. Here a simplified two-chamber cell is described although stacked cell operation works also. Mirror image anode and cathode cell bodies were constructed from polycarbonate sheets to which acrylic strips were welded to create the recesses of the cell chambers (Colorado Plastic Products Inc.). The cell chambers were sized to create an 8 inch by 10 inch active zone. The anode chamber active zone was ½ inch deep while the cathode chamber active zone was 1.5 inches deep and could contain about 2000 mL of cathode particles bed. When the anode and cathode cell bodies were clamped together while facing each other and sandwiching sealing foam strips and the separator membrane, a completed electrolytic cell was formed. Electrolyte inlet and outlet ports were created as needed as were liquid tight electrical feedthroughs using common polypropylene compression fittings (Cole Parmer). Two 4 inch×14 inch EC-600 (Eltech Systems Corporation) anodes were mounted side by side in the anode chamber to create the anode. Spacers were added on both sides to ensure free electrolyte access to the anode. The anodes extended out the top of the cell allowing simple dry clamp type electrical contacts to be utilized. Two 4 inch×10 inch×0.0625 inch 316 stainless steel plates (McMaster Carr) were mounted at the back of the cathode chamber to act as current distributors which define the active area of the cell. Two ¼ inch dia. 316 stainless steel rods were mounted to each plate and passed through liquid tight feedthroughs to provide external electrical contact points suitable for simple dry clamp type electrical contacts to be utilized. Cut 302/304 stainless steel wire (2 mm as cut, Pellets LLC) were used as the cathode particles bed. Standard 1 inch dia.×13 inch Wood augers (Hickory Tools, Home Depot were mounted in the cathode chamber to effect cathode particles bed churning. The augers were coated with polyurethane to prevent corrosion in the synthetic acid mine drainage used for the electrowinning tests. Extenders were added to the augers so that they protruded out the top of the cell and gear and belt drive so that they could be easily rotated by a single external motor. A small variable speed DC gearmotor (2709K16, McMaster Carr) and a variable DC power supply (Extech 382213, Grainger) were used to rotate the augers and control the rotation speed (operated in controlled voltage mode at 24 volts). A microporous ultra high weight polyethylene membrane extending beyond the edges of the cell chambers (Gray Daramic—0.0097 inch thick, Polypore International Inc.) was used to separate of the anode and cathode chambers when they were clamped together. The edges of the anode and cathode chamber were lined with a continuous layer of ⅛ inch thick closed cell polyvinyl chloride foam (McMaster Carr) to create a gasket type seal when the cell bodies were clamped together.

The electrochemical cell was operated in a batch mode utilizing a recirculating system for the electrolytes. For this demonstrative work the electrolyte was shared so that both the anolyte and catholyte circulation were taken from and returned to the same single reservoir. A 10 L volume of the standard solution was utilized for the batch operation. The majority of the electrolyte was circulated through the cathode chamber using a larger peristaltic pump (Model 7533-80 with a 7036-30 pump head, Barnant). A small portion of the electrolyte leaked into the anolyte chamber and was recirculated using simple gravity feed. Similarly a portion of the electrolyte was circulated through a 1 cm path length flow-through spectroscopic cell using a small peristaltic pump (model 900-1445, Barnant) to allow near real-time monitoring of the solution copper concentration. Filtering was used to remove any powder product generated which would impair the spectroscopic measurement. The pumps were powered and their speed controlled using variable DC power supplies (Extech 382213, Grainger) operating in the controlled voltage mode at 24 volts unless otherwise noted. All electrolyte circulation plumbing was either silicone, neoprene, polypropylene, or PVC while reservoirs were Nalgene®—all of which are stable to the solution employed. The electrolyte temperature was measured using a Teflon coated thermocouple (CASS-18G-12-PFA, Omega) while the pH was measured using a gel filled double junction pH electrode (PHE-1411, Omega) and a signal pre-amp (PHTX-21, Omega). Selected operation and performance parameters were monitored and digitally recorded each 10 seconds on a laptop computer using a analog to digital conversion data acquisition unit with multiple channels (HP 34970A data acquisition unit with a 34901A multiplexer module) and appropriate software (HP 34970A Data Logger 3). The copper concentration within the electrolyte was measured spectroscopically at 840 nm using a Spectrophotometer 20+ (22348-108, VWR). The analog output of the spectrophotometer was recorded and converted to copper concentration using a calibration curve prepared using copper standards prepared with a 0.1 M sodium sulfate and 0.05 M sulfuric acid background. The electrolytic cell was energized with a high current variable DC power supply (Model XFR12-100, Xantrex) operated in the controlled current mode. The cell was operated at a current of 20 A.

The technology was successfully demonstrated for the improved electrowinning of copper from synthetic acid mine drainage. The synthetic acid mine drainage comprised an aqueous solution to which compounds were added to provide the proper pH, target electroactive species, and background ions to explore the chemistry of interest. Specifically the standard solution employed was prepared by adding 249.5 g of copper sulfate pentahydrate, 142.1 g of sodium sulfate, and 500 mL of 1.0 M sulfuric acid to 9.5 L of water. This generated a synthetic acid mine drainage solution containing roughly 2000 ppm of cupric ions, 0.182 M sulfate and 0.1 M sodium ions and provided 0.1 M of protons. Although the nominal pH of 0.1 M sulfuric acid is pH=1.0, buffering due to the excess sulfate in the solution yields a pH of ~1.6.

Figure 10:
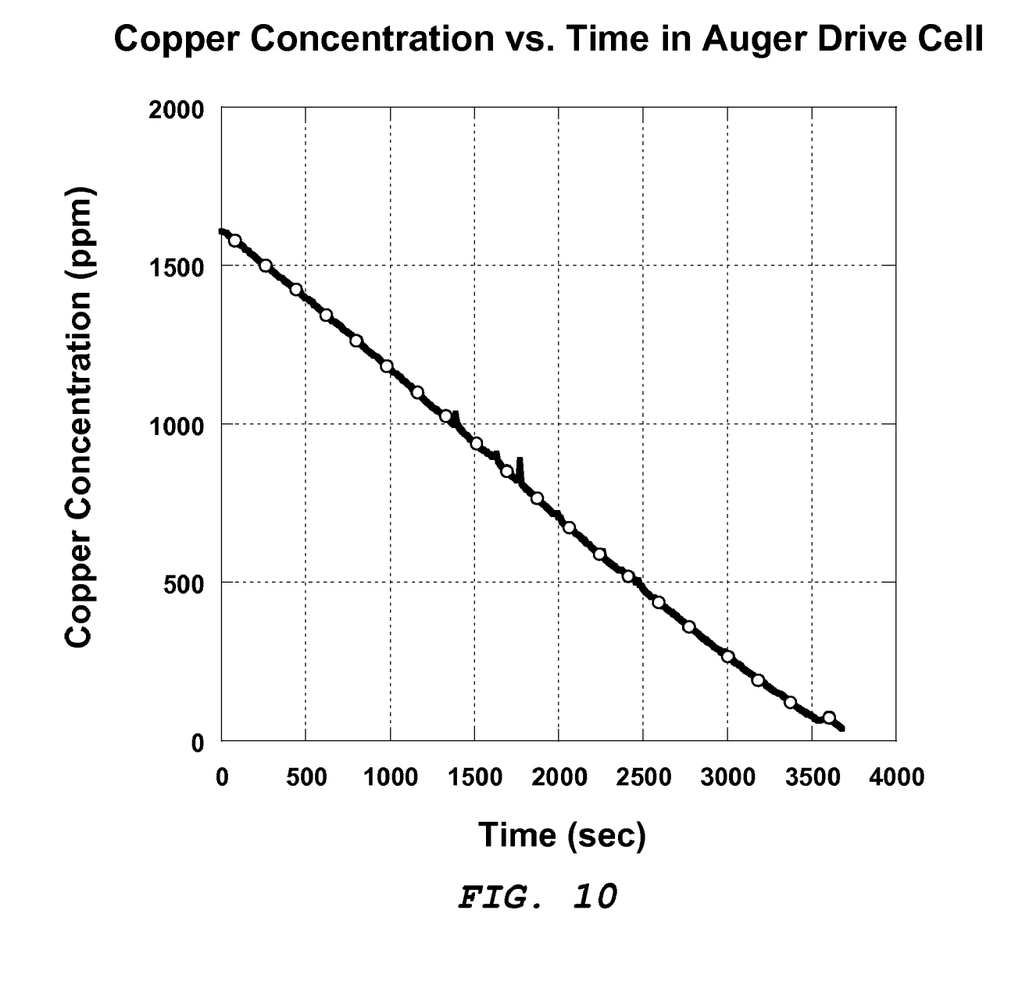
FIG. 10. is a graphic representation of copper concentration versus time during the operation of the proffered embodiment cell.

A stock solution with initial concentration slightly lower than the desired 2000 ppm copper starting point, and roughly 6.5 L of electrolyte was used. The salient operating parameters are tabulated in Table 1 while the observed performance is summarized in FIG. 10. The slope of the line in FIG. 10 indicates the copper removal rate. This data illustrates that the apparatus works consistently down to very low concentrations, lower than 100 ppm.

TABLE 1

Electrolytic Apparatus Operating Conditions

| Parameter | Value(s) | |
|---|---|---|
| Cell Power | Current: 20 Amp | |
| | Potential: 3.4-3.7 V | |
| Catholyte Pump | Current: 1.3 Amp | |
| | Potential: 24 V | |
| Auger Drive Unit | Current: 0.45 Amp | |
| | Potential: 24 V | |
| Copper Monitor Pump | Current: 0.9 Amp | |
| | Potential: 7 V | |
| Electrolyte Volume | 6.5 L | |
| Initial Copper Concentration | 1609 ppm | |
| Initial Copper Concentration | 38 ppm | |
| Treatment Time | 3600 sec | |
| Electrolyte pH | Initial: 1.6 | Final: 1.5 |
| Electrolyte Temperature | Initial: 21° C. | Final: 25° C. |

We claim:

1. An apparatus for electrochemical modification of liquid streams employing an electrolytic cell which comprises: an oxidation site defined by at least one anode assembly, an anode compartment comprising liquid electrolyte anolyte where oxidation is effected, a cathode compartment comprising liquid electrolyte catholyte where reduction is effected, a cathode comprising conducting cathode particulates forming a cathode particulate bed and a current feeder device in at least intermittent contact with said cathode particulates where the cathode particulates are in motion and the particulates motion is substantially independent of bulk electrolyte flow, a separator which confines the cathode particulates to the cathode compartment, constrains electrolyte flow through the particulate cathode bed and permits ionic conduction of current between the anode and cathode, a cathode particulate conveyance system that manipulates cathode particulates motion, a system for circulation of said liquid streams through the electrolytic cell, and a system for conducting unidirectional electric current supported by the liquid streams from the anode through the anolyte and the separator and into the catholyte and to the cathode particulates and to the current feeder device during the contact between the cathode particulates and the current feeder device.

2. The apparatus of claim 1 where the electrolyte comprises ionizing compounds dissolved in supporting solutions.

3. The apparatus of claim 2 where, the supporting solution is chosen from the set of solutions comprising liquid organic compounds, liquid inorganic compounds, and mixtures of liquid organic compounds and liquid inorganic compounds.

4. The apparatus of claim 2 where the supporting solution is chosen from the set of solutions comprising water, methanol, ethanol, all isomers of propanol, acetonitrile, carbon dioxide, ammonia, methylethyl ketone, tehydrofuran, dimethylsulfoxide, and mixtures thereof.

5. The apparatus of claim 1, where the at least one anode assembly incorporates at least one solid state surface.

6. The apparatus of claim 5, where the at least one solid state surface is a surface of at least one porous plate.

7. The apparatus of claim 5, where the at least one solid state surface is a surface of a part exhibiting a cylindrical symmetry.

8. The apparatus of claim 7, where the part exhibiting the cylindrical symmetry incorporates at least one porous cylinder.

9. The apparatus of claim 1, where the at least one anode assembly incorporates at least one geometrically stable anode.

10. The apparatus of claim 9, where the at least one geometrically stable anode comprises a conductive substrate combined with an oxidation catalyst.

11. The apparatus of claim 9, where the at least one geometrically stabile anode is chosen from commercial anodes consisting of a set of anodes that comprise platinized titanium, niobium coated copper, lead, lead alloy, and oxide coated conductive substrate.

12. The apparatus of claim 1, where the separator incorporates at least one surface arranged to define at least one plane.

13. The apparatus of claim 12, where the at least one surfaces is oriented non-horizontally.

14. The apparatus of claim 1 where, cathode particulates conveyance system that manipulates cathode particulates motion is a mechanical system that interacts with cathode particulates via direct mechanical interaction.

15. The apparatus of claim 14, where the mechanical system that interacts with cathode particulates via direct mechanical interaction system comprises at least one cathode particulates conveyor selected from the set consisting of a screw type conveyor, a moving bucket type conveyor, a moving belt type conveyor, and a combination type conveyor incorporating any combination of the screw, the moving bucket, or the moving belt.

16. The apparatus of claim 1, where the cathode particulates confined in the cathode compartment comprise materials arranged to conduct electric charges chosen from a set of electrically conductive and semiconductive materials consisting elements, metals, alloys, compounds, ceramics, organic polymers, and inorganic polymers.

17. The apparatus of claim 1, where the cathode particulates confined in the cathode compartment comprise materials with resistivites of less than 20,000 nano ohm centimeters.

18. The apparatus of claim 17, where the cathode particulates confined in the cathode compartment comprise materials with resistivites of less than 5,000 nano ohm centimeters.

19. The apparatus of claim 18, where the cathode particulates confined in the cathode compartment comprise materials with resistivites, of less than 1000 nano ohm centimeters.

20. The apparatus of claim 16, where the cathode particulates confined in the cathode compartment comprise ferromagnetic materials.

21. The apparatus of claim 16, where the cathode particulates confined in the cathode compartment comprise combinations of materials capable of conducting electrical currents and ferromagnetic materials.

22. The apparatus of claim 16, where the cathode particulates confined in the cathode compartment comprise materials chosen from the group consisting copper, aluminum, lead, nickel, iron, mild steel, stainless steel, zinc, titanium, silver, gold, platinum, palladium, tin, tungsten, carbon, and it's mixtures and combinations.

* * * * *